(12) United States Patent
Li et al.

(10) Patent No.: US 11,894,970 B2
(45) Date of Patent: Feb. 6, 2024

(54) DCN PACKET PROCESSING METHOD, NETWORK DEVICE, AND NETWORK SYSTEM

(71) Applicant: Huawei Technologies Co., Ltd., Shenzhen (CN)

(72) Inventors: Xiaodi Li, Dongguan (CN); Chuan Gao, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 16/453,692

(22) Filed: Jun. 26, 2019

(65) Prior Publication Data

US 2019/0319829 A1 Oct. 17, 2019

Related U.S. Application Data

(63) Continuation of application No. PCT/CN2017/101337, filed on Sep. 12, 2017.

(30) Foreign Application Priority Data

Dec. 26, 2016 (CN) .......................... 201611218007.6

(51) Int. Cl.
*H04L 41/04* (2022.01)
*H04J 3/16* (2006.01)
(Continued)

(52) U.S. Cl.
CPC ............ *H04L 41/04* (2013.01); *H04J 3/1652* (2013.01); *H04L 41/0893* (2013.01); *H04L 61/5007* (2022.05)

(58) Field of Classification Search
CPC . H04L 41/04; H04L 41/0893; H04L 61/2007; H04J 3/1652
(Continued)

(56) References Cited

U.S. PATENT DOCUMENTS 10,200,248 B1 * 2/2019 Jiang .................. H04L 41/0889
2008/0232366 A1 * 9/2008 He ......................... H04L 47/22
370/389
(Continued)

FOREIGN PATENT DOCUMENTS

CN 101064565 A 10/2007
CN 102136959 A 7/2011
(Continued)

OTHER PUBLICATIONS

IA OIF-FLEXE-01.0, Flex Ethernet Implementation Agreement, pp. 1-31; Mar. 2016.
(Continued)

*Primary Examiner* — Cheikh T Ndiaye
*Assistant Examiner* — Ayele F Woldemariam
(74) *Attorney, Agent, or Firm* — Leydig, Voit & Mayer, Ltd.

(57) ABSTRACT

A DCN packet processing method, a network device, and a network system are provided. The DCN packet processing method includes: generating, by a network device, a first DCN packet whose destination address is an IP address of an NMS, loading the first DCN packet into a Flex Ethernet (Flex Eth) overhead multiframe, and sending, over a physical link, the Flex Eth overhead multiframe to a network device that has accessed a network, so that the network device that has accessed the network extracts the first DCN packet, and sends the first DCN packet to the NMS based on the destination address, so as to enable the NMS to perceive that a new network device accesses the network.

13 Claims, 4 Drawing Sheets

(51) Int. Cl.
*H04L 41/0893* (2022.01)
*H04L 61/5007* (2022.01)

(58) Field of Classification Search
USPC ..................................................... 709/223
See application file for complete search history.

(56) References Cited

U.S. PATENT DOCUMENTS

| | | | |
|---|---|---|---|
| 2009/0287809 | A1 | 11/2009 | Chen et al. |
| 2012/0250695 | A1* | 10/2012 | Jia ................. H04L 41/0806 370/400 |
| 2015/0207668 | A1 | 7/2015 | Civil et al. |
| 2016/0119075 | A1 | 4/2016 | Gareau et al. |
| 2016/0119076 | A1 | 4/2016 | Gareau |
| 2016/0219024 | A1 | 7/2016 | Verzun et al. |
| 2016/0323164 | A1 | 11/2016 | Cao |
| 2017/0005742 | A1* | 1/2017 | Gareau ............. H04J 3/1658 |
| 2017/0005949 | A1* | 1/2017 | Gareau ............. H04L 12/413 |
| 2018/0076882 | A1* | 3/2018 | Prakash ............ H04B 10/27 |

FOREIGN PATENT DOCUMENTS

| | | | |
|---|---|---|---|
| CN | 102308523 | A | 1/2012 |
| CN | 102780569 | A | 11/2012 |
| CN | 104639360 | A | 5/2015 |
| CN | 105264778 | A | 1/2016 |
| CN | 108183764 | A * | 6/2018 ............ H04J 3/0608 |
| EP | 1197045 | B1 | 12/2007 |
| JP | 06261362 | A | 9/1994 |
| JP | H0832597 | A | 2/1996 |
| JP | 2007336604 | A | 12/2007 |
| JP | 2014225721 | A | 12/2014 |
| JP | 2016527771 | A | 9/2016 |
| WO | 2009086774 | A1 | 7/2009 |
| WO | WO-2012106935 | A1 * | 8/2012 ......... H04L 61/2514 |

OTHER PUBLICATIONS

IEEE Std 802.3.1™-2013, IEEE Standard for Management Information Base (MIB) Definitions for Ethernet, pp. 1-415.

"Mapping of Flex Ethernet Clients over OTN," COM15-C1213-E, pp. 1-7, International Telecommunication Union-Geneva, Switzerland (Jun. 2015).

"Flex Ethernet Implementation Agreement 1.0," IA OIF-FLEXE-01.0, pp. 1-31, Optical Internetworking Forum, Fremont, California (Mar. 2016).

* cited by examiner

DCN PACKET PROCESSING METHOD, NETWORK DEVICE, AND NETWORK SYSTEM

CROSS-REFERENCE TO RELATED APPLICATIONS

This application is a continuation of International Application No. PCT/CN2017/101337, filed on Sep. 12, 2017, which claims priority to Chinese Patent Application No. 201611218007.6, filed on Dec. 26, 2016. The disclosures of the aforementioned applications are hereby incorporated by reference in their entireties.

TECHNICAL FIELD

Embodiments of this application relates to the field of flexible Ethernet communications technologies, and more specifically, to a data communication network (DCN) packet processing method, a network device, and a network system.

BACKGROUND

A DCN is a network for transferring operation, management, and maintenance (OAM) information between a network management system NMS) and a network element (NE). An NE directly connected to the NMS serves as a gateway network element (GNE), and the NMS exchanges a DCN packet with another NE by using the GNE, so as to manage the NE.

At present, in a network construction process, a flexible Ethernet (Flex Eth) technology may be used for constructing a network between NEs, and a physical interface of the NE supports switching between a standard Ethernet mode and a Flex Eth mode. When each NE is switched to the Flex Eth mode, the NEs need to have same Flex Eth configuration, so as to conduct a Flex Eth channel between the NEs and exchange a DCN packet. Therefore, when a new NE is added to a network, to ensure management of the NMS on the newly added NE and exchange DCN packets between the NMS and the newly added NE, Flex Eth needs to be configured on the newly added NE, so that the newly added NE has same Flex Eth configuration as that of a directly connected NE.

In the prior art, when a new NE is added to the network, a technician needs to configure Flex Eth configuration for the newly added NE on site. In this case, a lot of manpower, material, and operation and maintenance costs are caused. In addition, because many parameters need to be configured, and a configuration process is relatively complex, once a configuration error occurs, reconfiguration is required, reducing access efficiency of the NE during network construction.

SUMMARY

In view of the above, this application provides a DCN packet processing method, a network device, and a network system, to conduct a channel between a network device and an NMS without manual configuration, so as to reduce costs during network construction and improve access efficiency of the network device during network construction.

Embodiments of this application provide the following technical solutions:

A first aspect of the embodiments of this application provides a DCN packet processing method, where the method includes:

generating, by a first network device, a first DCN packet, where a destination address of the first DCN packet is an IP address of a network management system NMS, a next hop through which the first DCN packet passes to arrive at the destination address is a second network device, and the first network device and the second network device are connected by using a physical link;

loading, by the first network device, the first DCN packet into a flexible Ethernet Flex Ethernet overhead multiframe; and sending, by the first network device, the Flex Ethernet overhead multiframe to the second network device over the physical link, so that the second network device extracts the first DCN packet from the Flex Ethernet overhead multiframe, and forwards the first DCN packet to the NMS.

In the foregoing solution, the first network device loads the generated first DCN packet into the Flex Eth overhead multiframe, and sends the Flex Eth overhead multiframe to the second network device over the physical link, and then the second network device sends the Flex Eth overhead multiframe to the NMS. In this case, a communications connection to the NMS is established, so that the NMS can perceive that a new network device accesses the network. This process does not require a technician to perform on-site manual configuration and operation and maintenance on the network device that newly accesses the network, thereby reducing manpower, material, and operation and maintenance costs. In addition, a process in which the first DCN packet is sent over the physical link requires no manual operation and is not likely to encounter an error, so that network accessing efficiency of the network device is further improved.

In a possible design, the loading, by the first network device, the first DCN packet into a flexible Ethernet Flex Ethernet overhead multiframe includes:

loading, by the first network device, the first DCN packet on a section management channel of the Flex Ethernet overhead multiframe; or loading, by the first network device, the first DCN packet on a shim to shim management channel of the Flex Ethernet overhead multiframe; or splitting, by the first network device, the first DCN packet and loading the first DCN packet on a section management channel and a shim to shim management channel of the flexible Ethernet Flex Ethernet overhead multiframe.

In the foregoing solution, the first network device loads the first DCN packet into the Flex Ethernet overhead multiframe in a plurality of manners, and options are various and flexible.

In a possible design, the method further includes:

generating, by the first network device, a second DCN packet, where a destination address of the second DCN packet is the IP address of the NMS, a next hop through which the second DCN packet passes to arrive at the destination address is the second network device;

monitoring, by the first network device, a state of a Flex Ethernet client, and determining that the state of the Flex Ethernet client is a conducted state; and sending, by the first network device, the second DCN packet to the second network device through the Flex Ethernet client.

In the foregoing solution, after determining that the state of the Flex Eth client is the conducted state, the first network device automatically switches a channel for sending the second DCN packet, that is, switches the physical link to a Flex Eth channel. When the first network device later exchanges a DCN packet with another network device, the Flex Eth channel may be used, so as to improve transfer efficiency of the DCN packet.

In a possible design, the method further includes: buffering, by the first network device, the first DCN packet; or buffering, by the first network device, the second DCN packet.

In the foregoing solution, the first DCN packet and the second DCN packet are buffered so as to avoid a packet loss.

A second aspect of the embodiments of this application provides a network device, used as a first network device, where the first network device includes:
- a generation unit, configured to generate a first DCN packet, where a destination address of the first DCN packet is an IP address of a network management system NMS, a next hop through which the first DCN packet passes to arrive at the destination address is a second network device, and the first network device and the second network device are connected by using a physical link;
- a loading unit, configured to load the first DCN packet into a flexible Ethernet Flex Ethernet overhead multiframe; and
- a sending unit, configured to send the Flex Ethernet overhead multiframe to the second network device over the physical link, so that the second network device extracts the first DCN packet from the Flex Ethernet overhead multiframe, and forwards the first DCN packet to the NMS.

In a possible design, the loading unit is configured to: load the first DCN packet on a section management channel of the flexible Ethernet Flex Ethernet overhead multiframe; or load the first DCN packet on a shim to shim management channel of the Flex Ethernet overhead multiframe; or load the first DCN packet on a section management channel and a shim to shim management channel of the flexible Ethernet Flex Ethernet overhead multiframe.

In a possible design, the first network device further includes a switching unit, where
- the generation unit is further configured to generate a second DCN packet, where a destination address of the second DCN packet is the IP address of the NMS, a next hop through which the second DCN packet passes to arrive at the destination address is the second network device; and
- the switching unit is configured to: monitor a state of a Flex Ethernet client, determine that the state of the Flex Ethernet client is a conducted state, and send the second DCN packet to the second network device over the Flex Ethernet client.

In a possible design, the first network device further includes a buffering unit, configured to: buffer the first DCN packet, or buffer the second DCN packet.

A third aspect of the embodiments of this application provides a network device, used as a first network device, where the first network device is connected to a second network device by using a physical link, and the first network device includes a memory and a processor that communicates with the memory;
- the memory is configured to store program code for processing a DCN packet; and
- the processor is configured to execute the program code stored by the memory to implement operations in the first aspect and all possible designs.

A fourth aspect of the embodiments of this application provides a DCN packet processing method, where the method includes:
- receiving, by a second network device, a flexible Ethernet Flex Ethernet overhead multiframe sent by a first network device over a physical link, and extracting a first DCN packet from the Flex Ethernet overhead multiframe, where a destination address of the first DCN packet is an IP address of a network management system NMS, the second network device is a next hop through which the first DCN packet passes to arrive at the destination address, and the second network device and the first network device are connected by using the physical link; and
- sending, by the second network device, the first DCN packet to the NMS based on the destination address.

In the foregoing solution, the second network device receives the Flex Ethernet overhead multiframe sent by the first network device, extracts the first DCN packet from the Flex Ethernet overhead multiframe, and forwards the first DCN packet to the NMS. This process does not require a technician to perform on-site manual configuration, and operation and maintenance, thereby reducing manpower, material, and operation and maintenance costs. In addition, this process requires no manual operation and is not likely to encounter an error, so that network accessing efficiency of the network device is further improved.

In a possible design, the extracting, by the second network device, a first DCN packet from the Flex Ethernet overhead multiframe includes:
- extracting, by the second network device, the first DCN packet from a section management channel of the Flex Ethernet overhead multiframe; or
- extracting, by the second network device, the first DCN packet from a shim to shim management channel of the Flex Ethernet overhead multiframe; or
- extracting, by the second network device, the first DCN packet from a section management channel and a shim to shim management channel of the Flex Ethernet overhead multiframe.

In a possible design, the second network device buffers the first DCN packet.

In the foregoing solution, the first DCN packet is buffered so as to avoid a packet loss.

A fifth aspect of the embodiments of this application provides a network device, used as a second network device, where the second network device includes:
- an extraction unit, configured to: receive a flexible Ethernet Flex Ethernet overhead multiframe sent by a first network device over a physical link, and extract a first DCN packet from the Flex Ethernet overhead multiframe, where a destination address of the first DCN packet is an IP address of a network management system NMS, the second network device is a next hop through which the first DCN packet passes to arrive at the destination address, and the second network device and the first network device are connected by using the physical link; and
- a sending unit, configured to send the first DCN packet to the NMS based on the destination address.

In a possible design, the extraction unit is configured to: extract the first DCN packet from a section management channel of the Flex Ethernet overhead multiframe; or extract the first DCN packet from a shim to shim management channel of the Flex Ethernet overhead multiframe; or extract the first DCN packet from a section management channel and a shim to shim management channel of the Flex Ethernet overhead multiframe.

In a possible design, the second network device further includes a buffering unit, configured to buffer the first DCN packet.

A sixth aspect of the embodiments of this application provides a network device, used as a second network device, where the second network device is connected to a first network device by using a physical link, and the second network device includes a memory and a processor that communicates with the memory;

the memory is configured to store program code for processing a data communication network DCN packet; and the processor is configured to execute the program code stored by the memory to implement operations in the fourth aspect and all possible designs in the fourth aspect.

A seventh aspect of the embodiments of this application provides a network system, including a network management system NMS, and a first network device and a second network device that are connected by using a physical link, where the first network device may be the network device in the second aspect or the third aspect, and the second network device is the network device in the fifth aspect or the sixth aspect.

An eighth aspect of the embodiments of this application provides a computer readable storage medium, configured to store a computer program, where the computer program includes an instruction for performing the method in the first aspect, the fourth aspect, any possible design of the first aspect, or any possible design of the fourth aspect.

DESCRIPTION OF EMBODIMENTS

Embodiments of this application provide a DCN packet processing method, a network device, and a network system, to conduct a channel between a network device and an NMS without manual configuration, so as to reduce costs during network construction and improve access efficiency of the network device during network construction.

In the embodiments, claims, and accompanying drawings of this application, the terms "first", "second", and the like are intended to distinguish between different objects but do not indicate a particular order. In addition, the terms "include" and "have" are not exclusive. For example, a process, a method, a system, a product, or a device including a series of steps or units is not limited to listed steps or units, and may further include steps or units that are not listed.

A Flex Eth technology, put forward by Optical Internetworking Forum (OIF), is a technology of supporting flexible rate-variable Ethernet. A flexible Ethernet shim (Flex Eth Shim) sublayer is added between a physical layer (PHY) and an Ethernet media access control (MAC) sublayer protocol, namely, a link layer, to implement a physical channel with a flexible bandwidth.

Based on a definition of standard OIF-FLEXE-01 of Flex Eth, for example, in the prior art, when Flex Eth networking is performed between NEs, the PHY is time-slotted. For example, based on a definition of an 802.3 100GBASE-R standard, a 100GE PHY is divided into 20 timeslots in total in Flex Eth, and each timeslot has a 5G bandwidth. The MAC flexibly selects one or more to-be-bound timeslots from one or more PHYs by using the FlexE Shim, and serves as a bandwidth-variable interface to carry a service, and a rate-variable Ethernet client is supported. A flexible Ethernet group (Flex Eth Group) between Flex Eth Shims includes 1-254 100GBASE-R Ethernet PHYs, and Flex Eth Group IDs at two ends of the Flex Eth Group need to be consistent. The Flex Eth Shim added between the MAC layer and the PHY layer may support eight flexible Ethernet ports/flexible Ethernet client (Flex Eth client), and each Flex Eth client has its independent MAC and reconciliation sublayer (RS).

Figure 1:
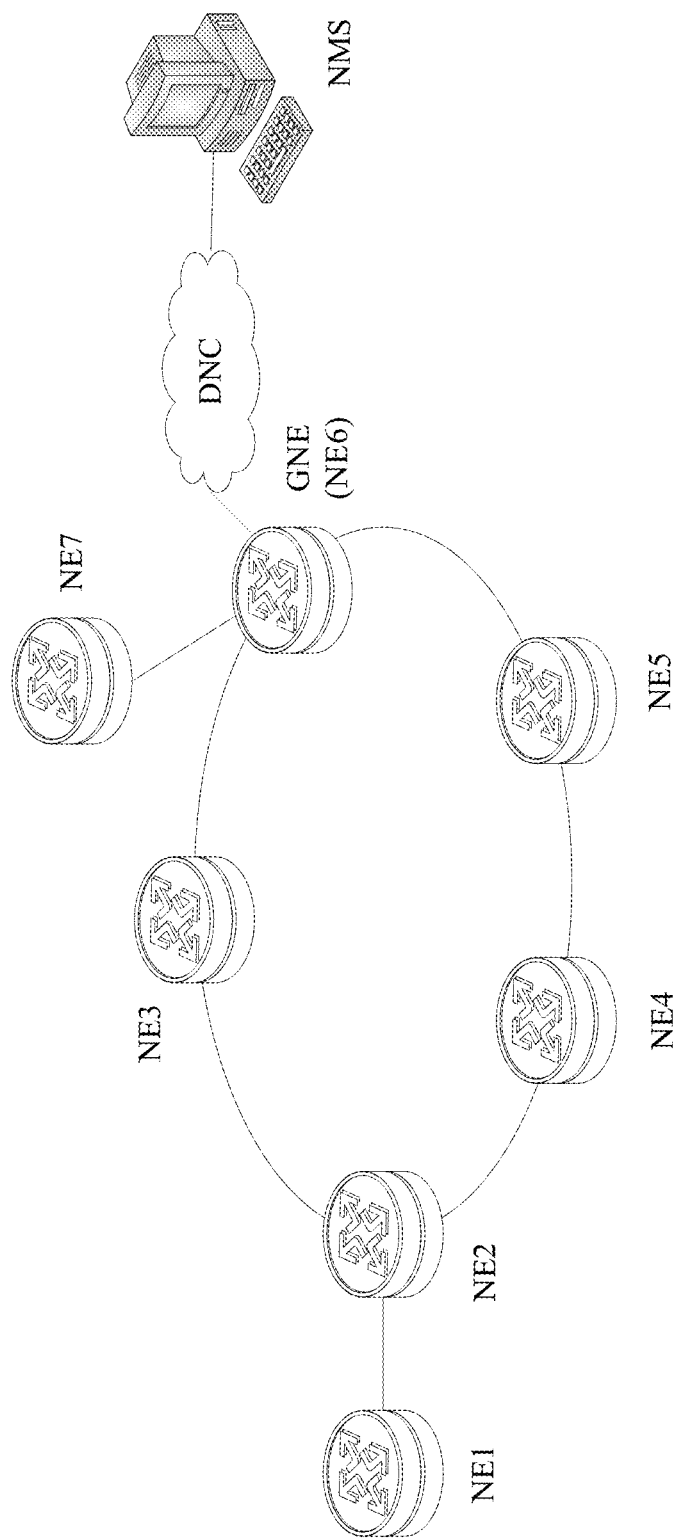
FIG. 1 is a schematic diagram of an application scenario of a network structure according to an embodiment of this application.

FIG. 1 is a schematic diagram of an application scenario of a network structure according to an embodiment of this application. The application scenario includes an NE1, an NE2, an NE3, an NE4, an NE5, an NE6, an NE7, an NMS and a DCN. NEs are connected by using a physical link, and the Flex Eth technology is used for Flex Eth networking. The NMS is connected to the NE by using the DCN. The DCN is a shared network with a service and is configured for communication between the NMS and the NE. The NE6 is directly connected to the NMS and serves as a GNE. The NMS manages the NE1, the NE2, the NE3, the NE4, the NE5, and the NE7 by using the GNE. For example, the NE1 and the NE7 in FIG. 1 are NEs that newly access the network structure. The NE1 is connected to the NE2 by using a physical link, uses the Flex Eth technology for Flex Eth networking with the NE2, and accesses the network. The NE7 is connected to the GNE by using a physical link, uses the Flex Eth technology for Flex Eth networking with the GNE, and accesses the network.

Based on a definition of standard OIF-FLEXE-01 of Flex Eth, in the prior art, when the NE1 performs Flex Eth networking with the NE2, and the NE7 performs Flex Eth networking with the GNE, the PHY is time-slotted. In addition, because a transfer mode of the DCN is not defined in the OIF-FLEXE-01 standard, in the prior art, a DCN packet needs to be transferred with a service packet by using a Flex Eth client.

To avoid that the NMS cannot perceive an NE that newly accesses the network, in a current network construction process based on the prior art, after a hardware technician enables the NE that needs to access the network to access the network by using a physical link, a software commissioning technician further needs to perform on-site Flex Eth configuration and operation and maintenance on the NE that newly accesses the network. In the prior-art manner, a large amount of manpower, material, and operation and maintenance costs are increased. In addition, because many parameters need to be configured, and a configuration process is relatively complex, once a configuration error occurs, reconfiguration is required, reducing access efficiency of the NE during network construction.

This embodiment of this application provides a DCN packet processing method, and 100GE Flex Eth is used as an example. Based on a definition of the Flex Eth in the 802.3 100GBASE-R standard, for one 100GBASE-R port, there is one overhead block (one overhead block is 66 bits) every 13.1 microseconds, each eight overhead blocks form one overhead frame, and each 32 overhead frames form one overhead multiframe. In an information transfer process, an overhead frame is transferred by using a PHY between two network devices, a part of information is transferred by using an overhead frame, and a part of information is transferred by using an overhead multiframe. For example, in an overhead frame, a section management channel occupies two overhead blocks, and a bandwidth is 1.222 Mbps; and a shim to shim management channel occupies three overhead blocks, and a bandwidth is 1.890 Mbps.

In the DCN packet processing method disclosed in this embodiment of this application, after a network device that newly accesses a network establishes a physical connection to a network device that has accessed the network, when starting, the network device that newly accesses the network generates a DCN packet, encapsulates the DCN packet into an overhead multiframe, and sends, over a physical link, the DCN packet to the connected network device that has accessed the network. The network device that has accessed the network sends the DCN packet to an NMS, so that a channel between the network device that newly accesses the network and the NMS is conducted, and the NMS perceives that a network device accesses the network. Further, the NMS manages the network device that newly accesses the network.

Compared with the prior art, in the DCN packet processing method disclosed in this embodiment of this application, the network device that newly accesses the network sends, over the physical link, the DCN packet loaded into the Flex Eth overhead multiframe, to establish a communications connection to the NMS, so that the NMS can perceive that a new network device accesses the network. This process does not require a person to perform Flex Eth configuration and operation and maintenance on the network device that newly accesses the network, thereby reducing manpower, material, and operation and maintenance costs. In addition, a process in which the DCN packet is sent over the physical link requires no manual operation and is not likely to encounter an error, so that network accessing efficiency of the network device is further improved.

The network device disclosed in this embodiment of this application includes a hardware device and software running on the hardware device. Optionally, the network device may be a switch or may be a router.

A specific implementation process of technical solutions disclosed in this embodiment of this application is described in detail by using the following embodiments.

Figure 2:
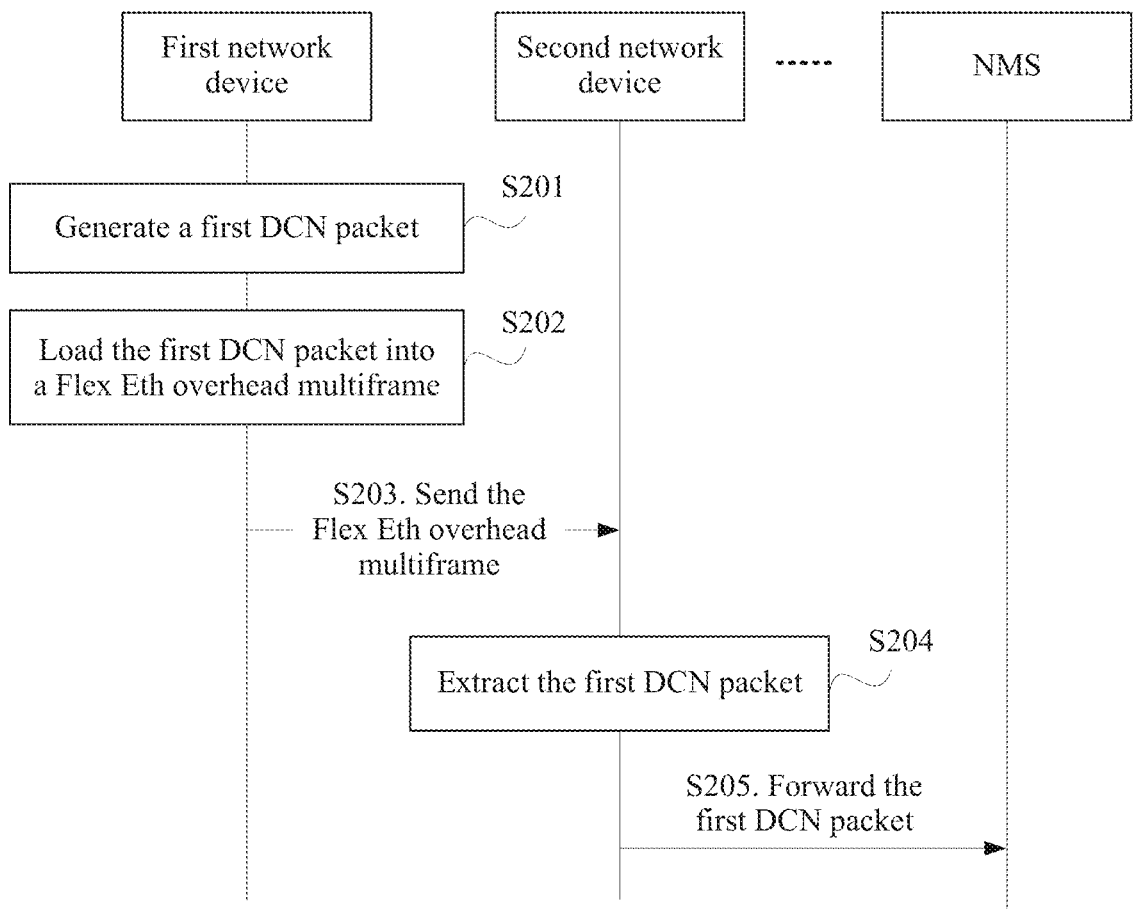
FIG. 2 is a schematic flowchart of a DCN packet processing method according to an embodiment of this application.

Based on the schematic diagram of the application scenario of the network structure shown in FIG. 1, FIG. 2 is a schematic flowchart of a DCN packet processing method according to an embodiment of this application, including:

S201. A first network device generates a first DCN packet.

For example, the first network device may be the NE1 in FIG. 1, or may be the NE7 in FIG. 1.

In specific implementation, after the first network device is physically connected, for example, the first network device may generate the first DCN packet when starting. A PPPoE encapsulation payload in the first DCN packet carries a destination address, and the destination address is an IP address of an NMS. That is, the first DCN packet needs to be finally sent to the NMS.

A format of a DCN packet is shown in Table 1.

TABLE 1

| DCN packet format | | | | |
|---|---|---|---|---|
| 6 DA | 6 SA | | PPPoE header | ... PPPoE encapsulation payload ... |

The DCN packet includes a 6-byte destination MAC address (Destination Address, DA), a 6-byte source MAC address (Source address, SA), a point-to-point protocol over Ethernet header (PPPoE header) whose format is shown in Table 2, and a PPPoE encapsulation payload that is a carried packet.

TABLE 2

| PPPoE header format | | | |
|---|---|---|---|
| | | | 4 |
| VER | TYPE | LENGTH | NEID |

In the PPPoE header format, VER refers to a version number of a PPPoE protocol.

TYPE refers to a type of the PPPoE protocol.

LENGTH refers to a payload length in the PPPoE, and usually occupies 2 bits.

NEID refers to a source network element identifier, and usually occupies 4 bits. In this embodiment of this application, NEID refers to an ID of the first network device.

S202. The first network device loads the first DCN packet into a Flex Eth overhead multiframe.

The Flex Eth overhead multiframe is a frame that is encapsulated by using a High-Level Data Link Control (HDLC) protocol after a network device is started, and that is sent externally at a fixed time interval.

A frame format of the HDLC is shown in Table 3. A frame of the HDLC includes a flag field, an address field (Address, A), a control field (Control, C), an information field (Information, I), a frame check sequence (FCS) field, and a label field. The flag field occupies 8 bits in a bit mode of "01111110F". The address field occupies 8 bits. The control field occupies 8 bits used to form various commands and responses. The information field occupies 8n bits, indicating any binary bit string with an undefined length. The label field occupies 8 bits in a bit mode of "01111110F".

In this embodiment of this application, the first DCN packet is loaded into the Flex Eth overhead multiframe, and a complete Flex Eth overhead multiframe is encapsulated into the information field of the HDLC and sent externally.

TABLE 3

| HDLC frame format | | | | | |
|---|---|---|---|---|---|
| 8 bit | 8 bit | 8 bit | 8n bit | 16 (32) bit | 8 bit |
| 01111110F | A | C P/F | I | FCS | 01111110F |

TABLE 3-continued

HDLC frame format

| 8 bit | 8 bit | 8 bit | 8n bit | 16 (32) bit | 8 bit |
|---|---|---|---|---|---|
| Flag | Address | Control | Information | Frame check sequence | Label |

Based on standard OIF-FLEXE-01 of Flex Eth, two management channels, namely, a section management channel and a shim to shim management channel on each PHY of the Flex Eth overhead multiframe are defined. A loading position of a DCN packet in the Flex Eth overhead multiframe may be preset.

Optionally, the first network device may load the first DCN packet into the section management channel of the Flex Eth overhead multiframe.

Optionally, the first network device may load the first DCN packet into the shim to shim management channel of the Flex Eth overhead multiframe.

Optionally, the first network device may also divide the first DCN packet into two parts that are respectively loaded on the section management channel and the shim to shim management channel of the Flex Eth overhead multiframe.

S203. The first network device sends the Flex Eth overhead multiframe to a second network device over a physical link.

In specific implementation, the Flex Eth overhead multiframe is sent to the second network device by using a PHY.

For example, if the first network device is the NE1 in FIG. 1, the second network device is the NE2 in FIG. 1. If the first network device is the NE7 in FIG. 1, the second network device is the GNE in FIG. 1.

The first network device is connected to the second network device by using the physical link. Because the physical link has been established between the first network device and the second network device, the first network device may send a data stream to the second network device by using the PHY. In a sending process, a management channel of each PHY performs transfer independently, and is not converged on a Flex Eth Group, so as to avoid that transfer of the DCN packet fails due to a management channel interruption when a PHY exception occurs.

The first network device determines, based on a local routing table, that a next hop network node through which the first DCN packet passes to arrive at the NMS is the second network device, and then sends an encapsulated Flex Eth overhead multiframe to the second network device over the physical link.

S204. The second network device receives the Flex Eth overhead multiframe sent by the first network device over the physical link, and extracts the first DCN packet from the Flex Eth overhead multiframe.

In specific implementation, optionally, after the encapsulated Flex Eth overhead multiframe is decapsulated, detection is performed on the section management channel and the shim to shim management channel of the Flex Eth overhead multiframe. If it is detected that the first DCN packet is loaded on the section management channel, the first DCN packet is extracted from the section management channel, and is presented in a PPPoE format.

If it is detected that the first DCN packet is loaded on the shim to shim management channel, the first DCN packet is extracted from the shim to shim management channel, and is presented in the PPPoE format.

If it is detected that the first DCN packet is loaded on the section management channel and the shim to shim management channel, the first DCN packet is extracted separately from the section management channel and the shim to shim management channel and combined to obtain an original DCN packet. The first DCN packet is presented in the PPPoE format.

S205. The second network device sends the first DCN packet to an NMS based on a destination address.

In a specific implementation process, the second network device sends the first DCN packet to the NMS based on the destination address in the first DCN packet. The destination address is the IP address of the NMS.

For example, if the first network device is the NE1 in FIG. 1, the second network device is the NE2 in FIG. 1. The NE2 is not directly connected to the NMS. If the NE2 determines, based on a local routing table and a destination MAC address carried in the first DCN packet, to send the first DCN packet to the NMS, and that a next network node to be passed through is the NE3, the NE2 sends the first DCN packet to the NE3. If the NE2 determines, based on the local routing table and the destination address carried in the first DCN packet, to send the first DCN packet to the NMS, and that a next network node to be passed through is the NE4, the NE2 sends the first DCN packet to the NE4.

For example, the NE2 sends the first DCN packet to the NE3. After the NE3 receives the first DCN packet sent by the NE2, the NE3 determines, based on a local routing table and the destination address carried in the first DCN packet, to send the first DCN packet to the NMS, and that a next network node to be passed through is the GNE, the NE3 sends the first DCN packet to the GNE. The GNE receives the first DCN packet forwarded by the NE3 and sends the first DCN packet to the NMS.

For example, if the first network device is the NE7 in FIG. 1, the second network device is the GNE in FIG. 1, and the GNE is directly connected to the NMS. Therefore, after extracting the first DCN packet, the GNE directly sends the first DCN packet to the NMS based on a local routing table and the destination address carried in the first DCN packet. The GNE does not need to forward the first DCN packet to another network device.

Executing to S201-S205, after accessing a network, the first network device loads the generated first DCN packet into the Flex Eth overhead multiframe, and sends, over the physical link, the Flex Eth overhead multiframe to a network device that has accessed the network, so that the network device that has accessed the network sends the Flex Eth overhead multiframe to the NMS. In this case, a communications connection to the NMS is established, so that the NMS can perceive that a new network device accesses the network. This process does not require a technician to perform on-site manual configuration and operation and maintenance on the network device that newly accesses the network, thereby reducing manpower, material, and operation and maintenance costs. In addition, a process in which the first DCN packet is sent over the physical link requires no manual operation and is not likely to encounter an error, so that network accessing efficiency of the network device is further improved.

Further, after the DCN packet processing method provided in this embodiment of this application is performed, the NMS can perceive that a new network device accesses the network, and further manage the newly accessed network device.

Optionally, in this embodiment of this application, the first network device loads the generated first DCN packet into the Flex Eth overhead multiframe for sending. To avoid a loss of the first DCN packet, the first network device provides a buffer space, and the generated first DCN packet is buffered in the buffer space. Due to a bandwidth limitation of the Flex Eth overhead multiframe, the first network device needs to set a size of the buffer space based on a bandwidth of the Flex Eth overhead multiframe, and control buffer traffic when the first DCN packet is buffered.

For example, if a bandwidth of the section management channel in the Flex Eth overhead multiframe is 1.222 Mbps, a bandwidth of the shim to shim management channel in the Flex Eth overhead multiframe is 1.890 Mbps.

A size of the buffer space that the first network device can provide is shown in formula (1), formula (2), or formula (3).

$$\text{Buffer size (byte)}=1.222*\text{Buffer duration}/8 \quad (1)$$

$$\text{Buffer size (byte)}=1.890*\text{Buffer duration}/8 \quad (2)$$

$$\text{Buffer size (byte)}=(1.222+1.890)*\text{Buffer duration}/8 \quad (3)$$

The buffer duration is duration required for storing the first DCN packet in the buffer space.

Optionally, the first network device may also provide a larger buffer space, or a technician sets a size of the buffer space as required.

For example, if a bandwidth of the section management channel in the Flex Eth overhead multiframe is 1.222 Mbps, a bandwidth of the shim to shim management channel in the Flex Eth overhead multiframe is 1.890 Mbps.

When the first network device buffers the first DCN packet, sending traffic that is sent to the buffer space is shown in formula (4), formula (5), or formula (6).

$$\text{Sending traffic}=\text{Length of the first DCN packet}*8*\text{Quantity of first DCN packets sent per second}<1.222 \quad (4)$$

$$\text{Sending traffic}=\text{Length of the first DCN packet}*8*\text{Quantity of first DCN packets sent per second}<1.890 \quad (5)$$

$$\text{Sending traffic}=\text{Length of the first DCN packet}*8*\text{Quantity of first DCN packets sent per second}<(1.222+1.890) \quad (6)$$

Optionally, in this embodiment of this application, the first network device may first buffer the first DCN packet, and then perform loading. The first network device may alternatively buffer and load the first DCN packet simultaneously.

Optionally, in this embodiment of this application, after receiving the first DCN packet sent by the first network device, the second network device may first buffer the first DCN packet and then process the first DCN packet. A specific manner of buffering the first DCN packet is the same as a manner in which the first network device buffers the first DCN packet. Reference may be made to the foregoing records, and details are not described herein again.

Further, if the second network device is not a GNE, in a process of forwarding the first DCN packet by the second network device to the NMS, network devices through which the first DCN packet passes may buffer the first DCN packet before forwarding the first DCN packet. A manner of buffering the first DCN packet is the same as the manner in which the first network device buffers the first DCN packet. Reference may be made to the foregoing records, and details are not described herein again. For example, if the first network device is the NE1 in FIG. 1, the second network device is the NE2 in FIG. 1. When the second network device forwards the first DCN packet to the NMS, the NE3 needs to be passed through. On the NE3, the first DCN packet is buffered in a manner as that on the NE1 and the NE2. In the foregoing embodiment of this application, the manner of buffering the first DCN packet may be used to avoid a packet loss of the first DCN packet.

Optionally, in this embodiment of this application, compared with DCN packet sending by using a Flex Eth client, the bandwidth of the Flex Eth overhead multiframe is relatively small. If the DCN packet is always transferred by using the Flex Eth overhead multiframe, transfer efficiency is relatively low. Therefore, based on the DCN packet processing method disclosed in the foregoing embodiment of this application, after a communications connection between the first network device that newly accesses the network and the NMS is established, the first network device may freely choose to send the DCN packet by using the Flex Eth client or to still send the DCN packet by using the Flex Eth overhead multiframe.

Optionally, in this embodiment of this application, the first network device may also automatically switch to the Flex Eth client to send the DCN packet after determining that a communications connection between the first network device and the NMS is established.

Figure 3:
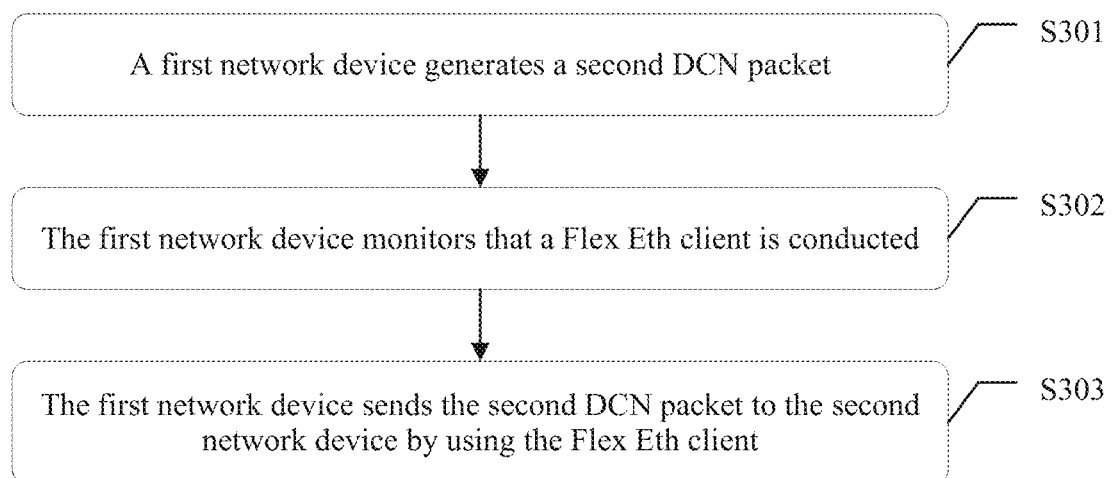
FIG. 3 is a schematic flowchart of another DCN packet processing method according to an embodiment of this application.

FIG. 3 is a schematic flowchart of another DCN packet processing method according to an embodiment of this application, including:

S301. A first network device generates a second DCN packet.

For example, the first network device may be the EN1 in FIG. 1, or may be the EN7 in FIG. 1. A destination address of the second DCN packet is an IP address of an NMS, and a next hop through which the second DCN packet passes to arrive at the destination address is a second network device.

S302. The first network device monitors a state of a Flex Eth client. If it is detected that the Flex Eth client is in a conducted state, performs S303; otherwise, loads the second DCN packet into a Flex Eth overhead multiframe, and sends the second DCN packet to an NMS based on steps similar to S202-S205 in the embodiment corresponding to FIG. 2 in this application.

In specific implementation, after the first network device starts, the first network device may monitor the state of the Flex Eth client in real time, or may monitor the state of the Flex Eth client according to a preset time or time interval. A specific time interval for monitoring the state of the Flex Eth client may be set by a technician.

S303. The first network device determines that the Flex Eth client is in the conducted state, and sends the second DCN packet to a second network device by using the Flex Eth client.

After determining that the state of the Flex Eth client is the conducted state, the first network device automatically switches a channel for sending the second DCN packet, that is, switches a physical link to a Flex Eth channel. When the first network device later exchanges a DCN packet with another network device, the Flex Eth channel may be used, so as to improve transfer efficiency of the DCN packet.

Further, the NMS may also send a management packet to the first network device through the Flex Eth channel, so as to manage the first network device.

Based on the DCN packet processing method disclosed in this embodiment of this application, an embodiment of this application further discloses a first network device for performing the DCN packet processing method.

Figure 4:
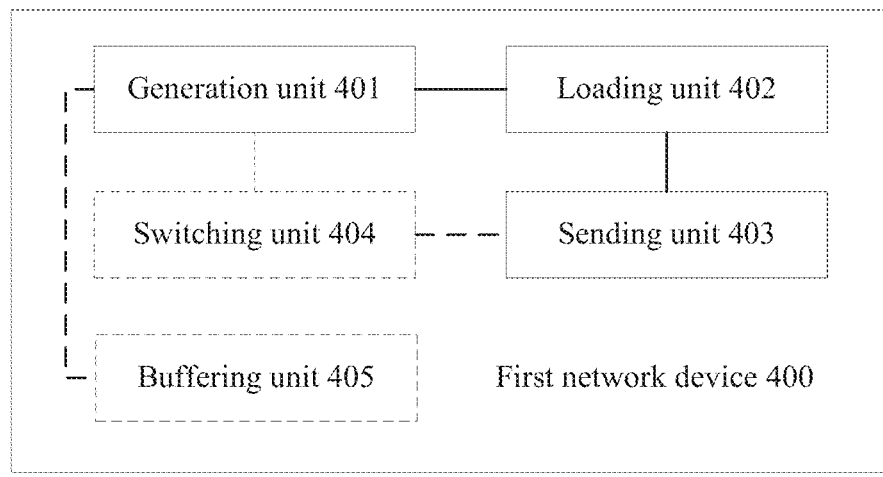
FIG. 4 is a schematic structural diagram of a first network device according to an embodiment of this application.

FIG. 4 is a schematic structural diagram of a first network device 400 according to an embodiment of this application.

The first network device 400 includes a generation unit 401, a loading unit 402, and a sending unit 403.

The generation unit 401 is configured to generate a first DCN packet, where a destination address of the first DCN packet is an IP address of an NMS, a next hop through which the first DCN packet passes to arrive at the destination address is a second network device, and the first network device and the second network device are connected by using a physical link.

The generation unit 401 may perform S201 shown in FIG. 2 in the embodiment of this application, and details are not described herein again.

The loading unit 402 is configured to load the first DCN packet generated by the generation unit 401 into a Flex Ethernet overhead multiframe.

In specific implementation, optionally, the loading unit 402 is configured to: load the first DCN packet into a section management channel of the Flex Ethernet overhead multiframe; or load the first DCN packet into a shim to shim management channel of the Flex Ethernet overhead multiframe; or load the first DCN packet into a section management channel and a shim to shim management channel of the Flex Ethernet overhead multiframe.

The loading unit 402 may perform S202 shown in FIG. 2 in the embodiment of this application, and details are not described herein again.

The sending unit 403 is configured to send the Flex Ethernet overhead multiframe to the second network device over the physical link.

The sending unit 403 may perform S203 shown in FIG. 2 in the embodiment of this application, and details are not described herein again.

Optionally, the first network device 400 further includes a switching unit 404.

In specific implementation, the generation unit 401 is further configured to generate a second DCN packet. A destination address of the second DCN packet is the IP address of the NMS, and a next hop through which the second DCN packet passes to arrive at the destination address is the second network device.

The generation unit 401 may perform S301 shown in FIG. 3 in the embodiment of this application, and details are not described herein again.

The switching unit 404 is configured to: monitor a state of a Flex Ethernet client, determine that the state of the Flex Ethernet client is a conducted state, and send the second DCN packet to the second network device through the Flex Ethernet client.

The switching unit 404 may perform S302 and S303 shown in FIG. 3 in the embodiment of this application, and details are not described herein again.

Optionally, the first network device 400 further includes a buffering unit 405.

The buffering unit 405 is configured to buffer the first DCN packet and/or the second DCN packet generated by the generation unit 401.

The buffering unit 405 buffers, in a preset buffer space, the first DCN packet and/or the second DCN packet generated by the generation unit 401. A size of the preset buffer space may be set based on a bandwidth of the Flex Eth overhead multiframe or a buffer requirement. For details, reference may be made to buffer-related records in the embodiments of this application.

With reference to the DCN packet processing method disclosed in the embodiment of this application, the first network device disclosed in this embodiment of this application may also be implemented directly by using hardware, a memory executed by a processor, or a combination thereof.

Figure 5:
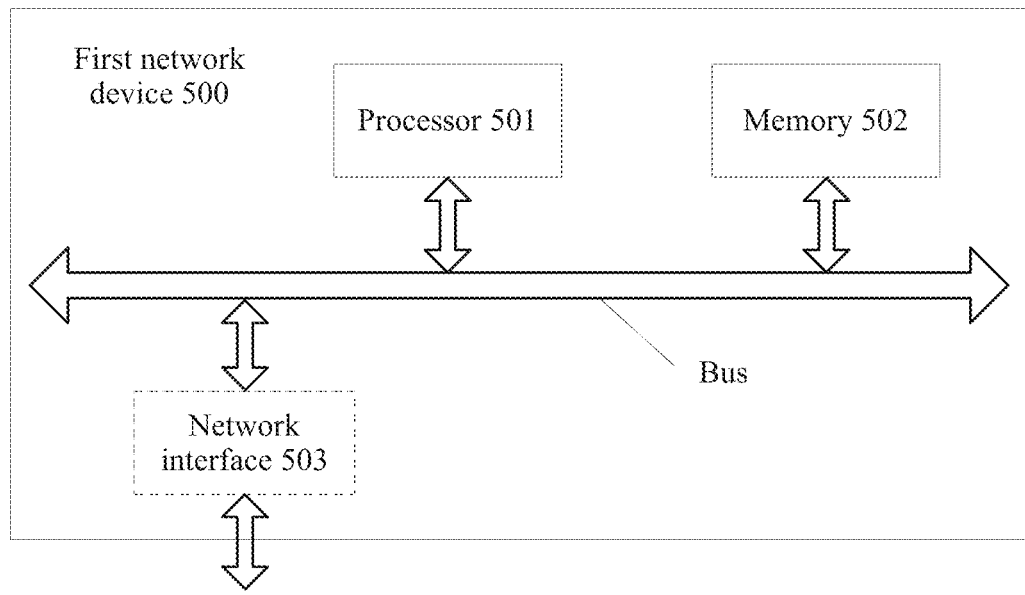
FIG. 5 is a schematic structural diagram of another first network device according to an embodiment of this application.

As shown in FIG. 5, a first network device 500 includes a processor 501 and a memory 502. Optionally, the network device 500 further includes a network interface 503. The processor 501 is coupled to the memory 502 by using a bus. The processor 501 is coupled to the network interface 503 by using the bus.

The processor 501 may be specifically a central processing unit (CPU for short), a network processor (NP for short), an application-specific integrated circuit (ASIC for short), or a programmable logic device (PLD for short). The PLD may be a complex programmable logical device (CPLD for short), a field-programmable logic gate array (FPGA for short), or a generic array logic (GAL for short).

The memory 502 may be specifically a content-addressable memory (CAM for short) or a random-access memory (RAM for short). The CAM may be a ternary content-addressable memory (Ternary CAM, TCAM for short).

The network interface 503 may be a wired interface, for example, a fiber distributed data interface (FDDI for short), or an Ethernet interface.

The memory 502 may also be integrated into the processor 501. If the memory 502 and the processor 501 are components independent of each other, the memory 502 is connected to the processor 501. For example, the memory 502 may communicate with the processor 501 by using the bus. The network interface 503 may communicate with the processor 501 by using the bus, or the network interface 503 may be directly connected to the processor 501.

The memory 502 is configured to store an operation program, code, or an instruction for processing a DCN packet. Optionally, the memory 502 includes an operating system and an application program, and is configured to store an operation program, code, or an instruction for processing a DCN packet.

When needing to process the DCN packet, the processor 501 or a hardware device invokes and executes the operation program, the code, or the instruction stored in the memory 502 to complete a processing process of the first network device in FIG. 2 and FIG. 3. For a specific process, reference may be made to a corresponding part of the foregoing embodiment of this application, and details are not described herein again.

It may be understood that FIG. 5 merely shows a simplified design of the network device. In an actual application, the network device may include any quantity of interfaces, processors, memories, and the like, and all network devices that can implement the embodiment of this application fall within a protection scope of this embodiment of this application.

Based on the DCN packet processing method disclosed in the embodiment of this application, an embodiment of this application further discloses a second network device for performing the DCN packet processing method. The second network device is connected to the first network device 400 shown in FIG. 4 in the embodiment of this application by using a physical link.

Figure 6:
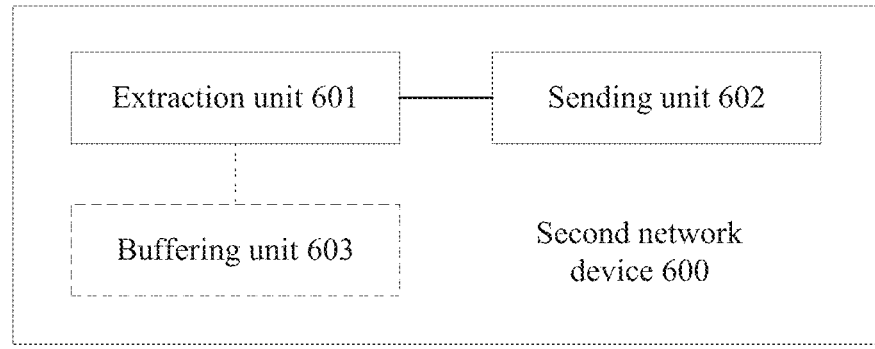
FIG. 6 is a schematic structural diagram of a second network device according to an embodiment of this application.

FIG. 6 is a schematic structural diagram of a second network device 600 according to an embodiment of this application. The second network device 600 includes an extraction unit 601 and a sending unit 602.

The extraction unit 601 is configured to: receive a Flex Ethernet overhead multiframe sent by a first network device over a physical link, and extract a first DCN packet from the Flex Ethernet overhead multiframe, where a destination address of the first DCN packet is an IP address of an NMS, and the second network device is a next hop through which the first DCN packet passes to arrive at the destination address.

In specific implementation, optionally, the extraction unit 601 is configured to: extract the first DCN packet from a section management channel of the Flex Ethernet overhead multiframe; or extract the first DCN packet from a shim to shim management channel of the Flex Ethernet overhead multiframe; or extract the first DCN packet from a section management channel and a shim to shim management channel of the Flex Ethernet overhead multiframe.

The extraction unit 601 may perform S204 shown in FIG. 2 in the embodiment of this application, and details are not described herein again.

The sending unit 602 is configured to send the first DCN packet to the NMS based on the destination address in the first DCN packet extracted by the extraction unit 601.

The sending unit 602 may perform S205 shown in FIG. 2 in the embodiment of this application, and details are not described herein again.

Optionally, the second network device 600 further includes a buffering unit 603.

The buffering unit 603 is configured to: buffer the first DCN packet extracted by the extraction unit 601, or buffer the first DCN packet before the sending unit 602 sends the first DCN packet.

The buffering unit 603 buffers the first DCN packet in a preset buffer space. A size of the preset buffer space may be set based on a buffer requirement. For details, reference may be made to buffer-related records in the embodiments of this application.

With reference to the DCN packet processing method disclosed in this embodiment of this application, the second network device disclosed in this embodiment of this application may also be implemented directly by using hardware, a memory executed by a processor, or a combination thereof. The second network device is connected to the first network device 500 shown in FIG. 5 in the embodiment of this application by using a physical link.

Figure 7:
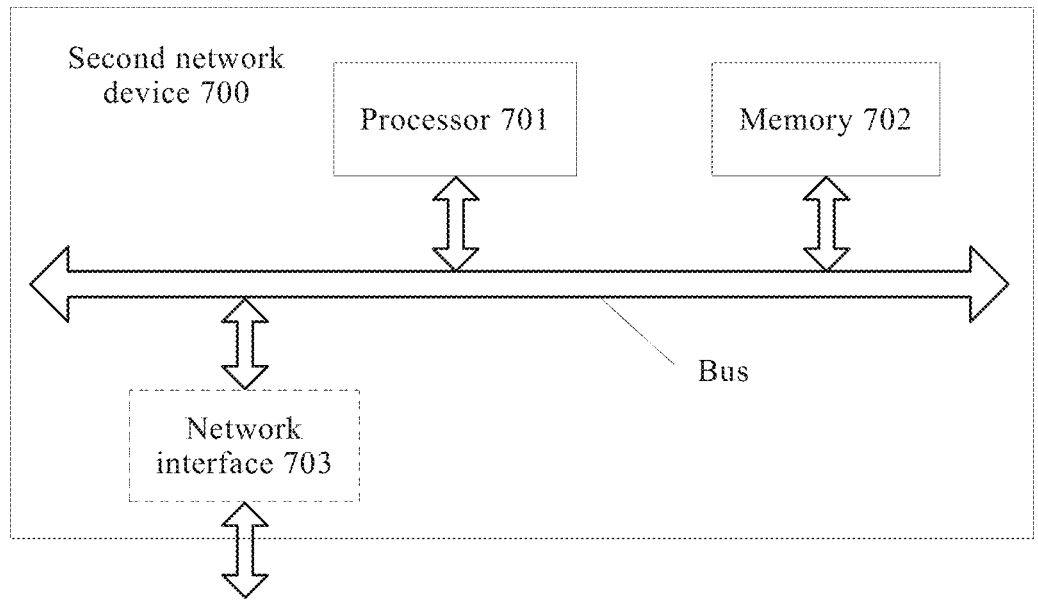
FIG. 7 is a schematic structural diagram of another second network device according to an embodiment of this application.

As shown in FIG. 7, a second network device 700 includes a processor 701 and a memory 702. Optionally, the network device 700 further includes a network interface 703. The processor 701 is coupled to the memory 702 by using a bus. The processor 701 is coupled to the network interface 703 by using the bus.

The processor 701 may be specifically a CPU, an NP, an ASIC, or a PLD. The PLD may be a CPLD, an FPGA, or a GAL.

The memory 702 may be specifically a CAM or a RAM. The CAM may be a TCAM.

The network interface 703 may be a wired interface, for example, an FDDI or an Ethernet client.

The memory 702 may also be integrated into the processor 701. If the memory 702 and the processor 701 are components independent of each other, the memory 702 is connected to the processor 701. For example, the memory 702 may communicate with the processor 701 by using the bus. The network interface 703 may communicate with the processor 701 by using the bus, or the network interface 703 may be directly connected to the processor 701.

The memory 702 is configured to store an operation program, code, or an instruction for processing a DCN packet. Optionally, the memory 702 includes an operating system and an application program, and is configured to store an operation program, code, or an instruction for processing a DCN packet.

When needing to process the DCN packet, the processor 701 or a hardware device invokes and executes the operation program, the code, or the instruction stored in the memory 702 to complete a processing process of the second network device in FIG. 2 and FIG. 3. For a specific process, reference may be made to a corresponding part of the foregoing embodiment of this application, and details are not described herein again.

It may be understood that FIG. 7 merely shows a simplified design of the network device. In an actual application, the network device may include any quantity of interfaces, processors, memories, and the like, and all network devices that can implement the embodiment of this application fall within a protection scope of this embodiment of this application.

Functional units in the embodiments of this application may be integrated into one processor, or each of the units may exist alone physically, or two or more circuits may be integrated into one circuit. The functional units may be implemented in a form of hardware, or may be implemented in a form of a software functional unit.

Figure 8:
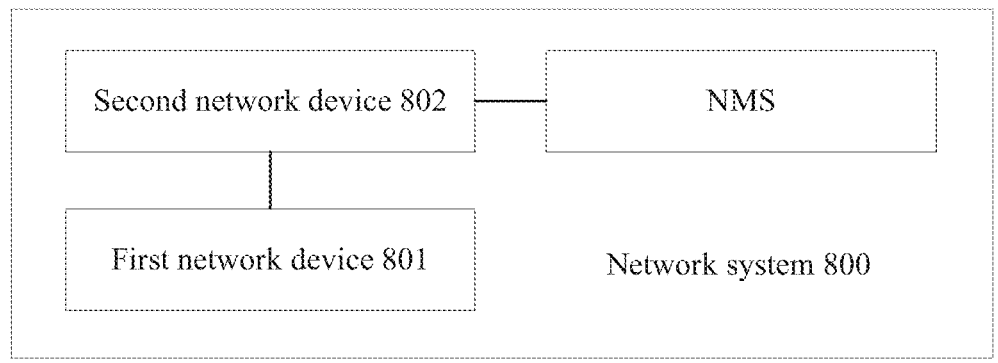
FIG. 8 is a schematic structural diagram of a network system according to an embodiment of this application.

FIG. 8 shows a network system 800 according to an embodiment of this application, including an NMS, and a first network device 801 and a second network device 802 that are connected by using a physical link.

The first network device 801 is configured to: generate a first DCN packet, where a destination address of the first DCN packet is an IP address of the NMS; load the first DCN packet into a Flex Ethernet overhead multiframe; and send the Flex Ethernet overhead multiframe to the second network device 802 over the physical link.

The second network device 802 is configured to: receive the Flex Ethernet overhead multiframe sent by the first network device 801 over the physical link, and extract the first DCN packet from the Flex Ethernet overhead multiframe.

The second network device 802 is further configured to forward the first DCN packet to the NMS based on the destination address of the first DCN packet.

In the network system disclosed in the embodiment of this application, the first network device 801 may be specifically the network device disclosed in FIG. 4 and FIG. 5, and is configured to perform corresponding operations performed by the first network device in FIG. 2 and FIG. 3 in the embodiments of this application. The second network device 802 may be specifically the network device disclosed in FIG. 6 and FIG. 7, and is configured to perform corresponding operations performed by the second network device in FIG. 2 and FIG. 3 in the embodiments of this application. For a specific process and an execution principle, reference may be made to the foregoing description, and details are not described herein again.

A person skilled in the art should be aware that in the foregoing one or more examples, functions described in this application may be implemented by hardware, software, firmware, or any combination thereof. When the present invention is implemented by software, the foregoing functions may be stored in a computer-readable medium or transmitted as one or more instructions or codes in the computer-readable medium. The computer-readable medium includes a computer storage medium and a communications medium, where the communications medium includes any medium that enables a computer program to be transmitted from one place to another. The storage medium may be any available medium accessible to a general- or specific-purpose computer.

The embodiments in this specification are all described in a progressive manner, for same or similar parts in the embodiments, reference may be made to these embodiments, and each embodiment focuses on a difference from other embodiments. Especially, apparatus and system embodiments are basically similar to a method embodiment, and therefore are described briefly; for related parts, reference may be made to partial descriptions in the method embodiment.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data communication network (DCN) packet processing method, wherein the method comprises:
   generating, by a first network device, a first DCN packet that includes a destination address and a payload, wherein the first network device and a second network device are connected using a physical link, and the DCN includes a network management system (NMS) communicatively coupled to the second network device;
   monitoring, by the first network device, a state of a Flex Ethernet client, and determining that the state of the Flex Ethernet client is not a conducted state;
   adding, by the first network device, the first DCN packet into a flexible Ethernet (Flex Ethernet) overhead multiframe; and
   sending, by the first network device, the Flex Ethernet overhead multiframe to the second network device by using the physical link, so that the second network device extracts the first DCN packet from the Flex Ethernet overhead multiframe, and forwards the first DCN packet to the NMS according to the destination address;
   generating, by the first network device, a second DCN packet that includes the destination address;
   monitoring, by the first network device, the state of a Flex Ethernet client, and determining that the state of the Flex Ethernet client is the conducted state; and
   sending, by the first network device, the second DCN packet to the second network device through the Flex Ethernet client according to the destination address.

2. The method according to claim 1, wherein adding the first DCN packet into the Flex Ethernet overhead multiframe comprises:
   adding, by the first network device, the first DCN packet on a section management channel of the Flex Ethernet overhead multiframe.

3. The method according to claim 1, further comprising: buffering, by the first network device, the first DCN packet.

4. The method according to claim 1, wherein adding the first DCN packet into the Flex Ethernet overhead multiframe comprises:
   adding, by the first network device, the first DCN packet on a shim to shim management channel of the Flex Ethernet overhead multiframe.

5. The method according to claim 1, wherein adding the first DCN packet into the Flex Ethernet overhead multiframe comprises:
   splitting, by the first network device, the first DCN packet and adding the first DCN packet on a section management channel and a shim to shim management channel of the Flex Ethernet overhead multiframe.

6. The method according to claim 1, further comprising: buffering, by the first network device, the second DCN packet.

7. The method according to claim 1, wherein:
   the second network device is communicatively coupled to the NMS using a second physical link; or
   the second network device is communicatively coupled to the NMS via one or more additional network devices, wherein a local routing table included in the second network device maps an address associated with the NMS to a third physical link associated with a particular network device of the one or more additional network devices.

8. The method according to claim 1, further comprising: receiving, from the NMS, a management packet via a Flex Ethernet channel established between the NMS and the first network device based on the first DCN packet.

9. A network device, used as a first network device, wherein the first network device comprises:
   a memory comprising instructions;
   one or more processors coupled to the memory, wherein the instructions, when executed by the one or more processors, cause the first network device to be configured to:
   generate a first data communication network (DCN) packet that includes a destination address and a payload, wherein the first network device and a second network device are connected using a physical link, and the DCN includes a network management system (NMS) communicatively coupled to the second network device;
   monitor a state of a Flex Ethernet client, and determining that the state of the Flex Ethernet client is not a conducted state;
   load the first DCN packet into a flexible Ethernet (Flex Ethernet) overhead multiframe; and
   send the Flex Ethernet overhead multiframe to the second network device over the physical link, so that the second network device extracts the first DCN packet from the Flex Ethernet overhead multiframe, and forwards the first DCN packet to the NMS according to the destination address,
   generate a second DCN packet that includes the destination address;
   monitor the state of a Flex Ethernet client, and determining that the state of the Flex Ethernet client is the conducted state; and
   send the second DCN packet to the second network device through the Flex Ethernet client according to the destination address.

10. The network device according to claim 9, wherein the instructions cause the first network device to be configured to:
    load the first DCN packet on a section management channel of the Flex Ethernet overhead multiframe.

11. The network device according to claim 9, wherein the instructions cause the first network device to be configured to: buffer the first DCN packet.

12. The network device according to claim 9, wherein the instructions cause the first network device to be configured to:
    load the first DCN packet on a shim to shim management channel of the Flex Ethernet overhead multiframe.

13. The network device according to claim 9, wherein the instructions cause the first network device to be configured to:

load the first DCN packet on a section management channel and a shim to shim management channel of the Flex Ethernet overhead multiframe.

* * * * *

UNITED STATES PATENT AND TRADEMARK OFFICE
CERTIFICATE OF CORRECTION

PATENT NO. : 11,894,970 B2
APPLICATION NO. : 16/453692
DATED : February 6, 2024
INVENTOR(S) : Li et al.

Page 1 of 1

It is certified that error appears in the above-identified patent and that said Letters Patent is hereby corrected as shown below:

In the Claims

Claim 1: Column 17, Line 32: "Flex Ethernet client is not a conducted state:" should read -- Flex Ethernet client is not a conducted state; --.

Signed and Sealed this
Fourteenth Day of May, 2024

Katherine Kelly Vidal
*Director of the United States Patent and Trademark Office*